United States Patent
Keithley

(10) Patent No.: US 7,271,821 B2
(45) Date of Patent: Sep. 18, 2007

(54) LASER PRINTER WITH REDUCED BANDING ARTIFACTS

(75) Inventor: Douglas Gene Keithley, Boise, ID (US)

(73) Assignee: Marvell International Technology Ltd. (BM)

( * ) Notice: Subject to any disclaimer, the term of this patent is extended or adjusted under 35 U.S.C. 154(b) by 274 days.

(21) Appl. No.: 11/016,004

(22) Filed: Dec. 16, 2004

(65) Prior Publication Data

US 2006/0132587 A1 Jun. 22, 2006

(51) Int. Cl.
*B41J 2/435* (2006.01)
*B41J 2/47* (2006.01)
*G06K 1/00* (2006.01)

(52) U.S. Cl. .................. 347/224; 347/252; 358/1.2

(58) Field of Classification Search .............. 347/224, 347/255, 247, 134, 234, 252, 243; 358/1.2, 358/474
See application file for complete search history.

(56) References Cited

U.S. PATENT DOCUMENTS

| | | | | |
|---|---|---|---|---|
| 4,295,145 A | * | 10/1981 | Latta | 347/255 |
| 4,396,928 A | * | 8/1983 | Abe et al. | 347/247 |
| 4,414,583 A | | 11/1983 | Hooker, III | |
| 4,563,747 A | * | 1/1986 | Tidd | 396/549 |
| 5,193,008 A | * | 3/1993 | Frazier et al. | 358/1.2 |
| 5,258,856 A | * | 11/1993 | Shinada | 358/474 |
| 5,315,322 A | * | 5/1994 | Bannai | 347/134 |
| 5,808,655 A | * | 9/1998 | Haas et al. | 347/234 |
| 6,803,941 B2 | * | 10/2004 | Hayashi et al. | 347/252 |
| 6,804,417 B1 | | 10/2004 | Lund et al. | |
| 2003/0112321 A1 | | 6/2003 | Pierson | |
| 2003/0210323 A1 | | 11/2003 | Turner | |
| 2004/0246330 A1 | * | 12/2004 | Hayashi et al. | 347/243 |

FOREIGN PATENT DOCUMENTS

EP 0480437 A1 4/1992
GB 2300779 A 11/1996

OTHER PUBLICATIONS

Search Report from British Patent Office for Application No. GB0525467.7 dated Apr. 6, 2006.

* cited by examiner

*Primary Examiner*—Hai Pham
*Assistant Examiner*—Carlos A. Martinez, Jr.

(57) ABSTRACT

A laser scanning assembly generates a laser beam and scans the laser beam through a plurality of scan lines to form desired dots. Each scan line is positioned to overlap an adjacent scan line and each dot includes a plurality of segments. The scanning assembly scans the laser beam through multiple scan lines to fully discharge each segment of each dot. The laser scanner assembly would typically be part of a laser printer.

35 Claims, 10 Drawing Sheets

LASER PRINTER WITH REDUCED BANDING ARTIFACTS

BACKGROUND OF THE INVENTION

FIG. 1 shows a typical laser printer 10 including a movable photoreceptor 12, typically a revolving drum or cylinder. This drum 12 is made out of a highly photoconductive material that is discharged by light photons. Initially, the photoreceptor drum 12 is given a total positive charge by a charging electrode 14, typically a wire or roller having a current running through it. As the drum 12 revolves, the printer 10 uses a laser unit 16 (such as a laser diode) to shine a laser beam 18 across the surface of the drum 12 to discharge certain points. In this manner, the laser beam 18 "draws" the text and images to be printed as a pattern of electrical discharges (an electrostatic image) on the drum 12. If the laser beam 18 is modulated, resulting variations in charge on the drum 12 will ultimately be translated to proportionate amounts of toner deposited on a sheet of paper 21.

After the laser beam 18 scans the desired electrostatic pattern on the drum 12, the printer 10 uses a toner roller 20 to coat the drum 12 with positively charged toner powder. Since the toner has a positive charge, it clings to the negative discharged areas of the drum 12 that have been scanned by the laser beam, but the toner does not cling to the positively charged "background" of the drum. With the toner pattern affixed to the drum 12, the drum rolls over the sheet of paper 21 traveling below it. Before the paper 21 travels under the drum 12, the paper is given a negative charge that is stronger than the negative charge of the electrostatic image on the drum 12 so that the paper pulls the toner powder away from the drum 12. Finally, the printer 10 passes the paper 21 through a fuser 24, which is typically a pair of heated rollers and as the paper 21 passes through the fuser 24, the loose toner powder on the paper melts, fusing with the fibers in the paper and forming a permanent image on the paper. After the toner on the drum 12 is transferred to the paper 21, the drum surface passes a discharge lamp 22 that generates a bright light that exposes the entire photoreceptor surface of the drum 12, erasing the electrostatic image. The drum surface then passes the charging electrode 14, which reapplies a positive charge to the surface of the drum 12 in anticipation of the laser beam 18 scanning the next image to be printed onto the drum.

FIG. 2 is a functional top view of the printer 10 of FIG. 1 showing a number of dark areas 200 on the drum 12 that represent the negatively discharged areas or dots created by the scanning laser beam 18. FIG. 3 shows a perspective view of portions of the laser printer 10 in FIG. 1 better showing the scanning of the laser beam 18 in a horizontal direction across the drum 12 as indicated by an arrow 300. Image processing circuitry (not shown) controls the laser unit 16 to modulate the laser beam 18 as the beam scans across the drum 12 in the horizontal direction 300 one line at a time. The image processing circuitry controls the laser unit 16 to turn ON and emit a pulse of light for every dot to be printed in a given horizontal line and to turn OFF where no dots are to be printed in the line.

In scanning the laser beam 18 across the drum 12, the laser unit 16 does not actually move the laser beam 18 itself but instead bounces the laser beam 18 off of a movable mirror 26, such as a rotating mirror or an oscillating mirror. As the mirror 26 moves, it reflects the laser beam 18 through a series of lenses (not shown) and onto the drum 12. These lenses change characteristics of the light beam 18 to compensate for image distortion that would otherwise be caused by the varying distance between the mirror 26 and points along the drum 12.

The laser printer 10 is designed to print pages of paper 21 at a fast rate, meaning the mirror 26 must move at a very fast rate to scan the beam in the horizontal direction and drum 12 must rotate at a fast rate to transfer toner deposited on the drum to the paper. As a result, laser printers with this type of architecture have proven to be extremely sensitive to variations in the rotational speed of the drum 12. These variations in speed of the drum 12 appear on the paper 21 as increased or decreased spacing between horizontal scan lines of dots or pixels formed by the horizontally scanning laser beam 18 and visually appear on the paper as bands. This undesirable effect is called "banding" with the visually noticeable bands being referred to as "banding artifacts."

Banding will now be described in more detail with reference to FIGS. 4-6. FIG. 4 is a diagram of an ideal scan line pattern 400 produced by the laser printer 10 of FIG. 1 where the rotational speed of the photoconductive drum 12 is constant. The scan line pattern 400 is a pattern of horizontal lines that the laser beam 18 scans along the surface of the drum 12. In the example of FIG. 4, the laser beam 18 scans from left to right in generating each scan line 402-406. In the scan line pattern 400, as the laser beam 18 scans each line 402-406 the laser beam is turned ON and OFF or modulated to generate the desired discharge areas or dots in each scan line. A vertical column of dots including dots 408-412 in FIG. 4 is an example of a discharged area generated by the laser beam 18 as the laser beam traverses the scan lines 402-406. The scan line pattern 400 is ideal in that each scan line 402-406 is perfectly positioned adjacent other scan lines so that the dots 408-412 may be formed in the consecutive scan lines to print the desired vertical column of dots and the corresponding text and/or images including this vertical column of dots. A vertical line 414 shown in FIG. 4 extending vertically from the vertical midpoint of scan line 402 and extending to the vertical midpoint of scan line 406 will be discussed in more detail below with reference to FIG. 6.

FIG. 5 is a diagram of scan line pattern 500 produced by the laser printer 10 that includes banding caused by variations in the rotational speed of the photoconductive drum 12. When the drum 12 rotates too fast, a space or gap G between scan lines 502 and 504 occurs and leads to under development or removal of charge on the drum in this gap, which causes light areas on the paper 21. In the example of FIG. 5, the gap G occurs between scan lines 502 and 504 as shown. A vertical column of dots including dots 508-512 being formed in scan lines 502-506 is thus shifted downward by the gap G so that no charge in this vertical column is removed in the gap. Ideally the top portion of the dot 510 would be formed in the gap G just under the dot 508 in the scan line 502, but due to the increase in speed of the drum 12 and resulting gap G there is no discharge in this area. This results in a light horizontal line or "band" between all dots 508 formed in line 502 and dots formed in line 504. Note that the average rotational speed of the drum 12 is correct due to the operation of control circuitry (not shown) that controls a motor (also not shown) that drives the rotation of the drum. As a result, an increase in rotational speed of the drum 12 will necessarily be followed by a period during which the drum slows down, offsetting the increase in velocity so the desired average velocity is realized. As a result of this slowing down of the drum 12, some scan lines 502-506 may overlap. This is shown in FIG. 5 for scan lines 504 and 506 where the bottom of scan line 504 is shown as dotted since the top of scan line 506 overlaps the bottom of scan line 504 due to the drum 12 slowing down. This overlap results in a region 513 being undesirably scanned twice, once during scan line 504 and once during scan line 506. Note that this additional scan of this region during scan line 506 does not affect the discharge of this region since the region will have been completely discharged during scan line 504 so the region is unaffected by scan line 506 since there is no additional charge removed. A vertical line 514 shown in FIG. 5 extending vertically from the vertical midpoint of scan line 502 and extending to the vertical midpoint of scan line 506 will be discussed in more detail below with reference to FIG. 6.

FIG. 6 is a graph showing the variation in the discharge of dots in the vertical columns of dotsin the scan line patterns 400 and 500 of FIGS. 4 and 5, respectively. The vertical lines 414 and 514 shown in FIGS. 4 and 5 represent the vertical axis in FIG. 6 and represents the scan line number or physical location in the scan lines in the vertical direction. The scan line number 1 on the vertical axis in FIG. 6 corresponds to the midpoint of the scan lines 402 and and 502. The dotted line in the graph of FIG. 6 corresponds to the ideal pattern 400 where consecutive vertically aligned dots 408-412 are being formed in scan lines 402-406. The horizontal axis in the graph represents the discharge of these dots 408-412, with 1 being fully discharged and 0 being not discharged at all so no dot will be formed. Thus, ideally each of the dots being formed in scan lines 402-406 is completely discharged to 1 as shown by the dotted line in FIG. 6. In contrast, where banding occurs there is a gap in this vertical discharge distribution corresponding to the gap G on the drum 12 of FIG. 5. The graph shows that in the gap G, which corresponds approximately to line number 1.5 in the graph, the discharge falls to zero meaning there is no discharge at all. The discharge then increases again to 1 at just before line number 2 due to the dot 510 in the scan line 504 after the gap G. The discontinuity in the discharge graphically shows why banding occurs since where there has been no discharge no toner will be attracted to the drum 12 in this region. It should be noted that the example of FIG. 6 assumes a perfect linear discharge of the drum 12 and a perfectly uniform laser beam 18. The actual discharge pattern would be different due to nonlinear discharge of regions on the drum 12 and due to a nonuniform intensity profile for the laser beam 18, which would typically be a Gaussian intensity distribution. All examples discussed herein assume a perfect discharge and perfectly uniform laser beam 18 to simplify the examples and allow the concept of overlapping scan lines to be more easily described under these ideal operating conditions.

The principle cause of variations in the speed of rotation of the drum 12 and resulting banding is due to gear noise in gears driving the drum. Gear noise results from imperfect spacing of teeth on the gears, variances in flexing of gear teeth, and other intrinsic variations in gear force transfer. Imperfections on the surfaces of the movable mirror 26 and vibration of the laser unit 16 and mirror 26 relative to the drum 12 can also contribute to banding. Accordingly, existing attempts to reduce banding have focused on improving the mechanical components in the printer 10 in attempts to reduce gear noise and to rotate the drum 12 at a more constant velocity. These approaches, however, can add significantly greater expense to the mechanical components of the printer 10 and thus to the overall cost of the printer.

There is a need for reducing banding in a laser printer without adversely affecting the cost of the laser printer.

SUMMARY OF THE INVENTION

According to one aspect of the present invention, a laser scanning assembly generates a laser beam and scans the laser beam through a plurality of scan lines to form desired dots. Each scan line is positioned to overlap an adjacent scan line and each dot includes a plurality of segments. The scanning assembly scans the laser beam through multiple scan lines to fully discharge each segment of each dot.

DESCRIPTION OF THE INVENTION

The following discussion is presented to enable a person skilled in the art to make and use the invention. Various modifications to the preferred embodiment will be readily apparent to those skilled in the art, and the generic principles herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

Figure 2:
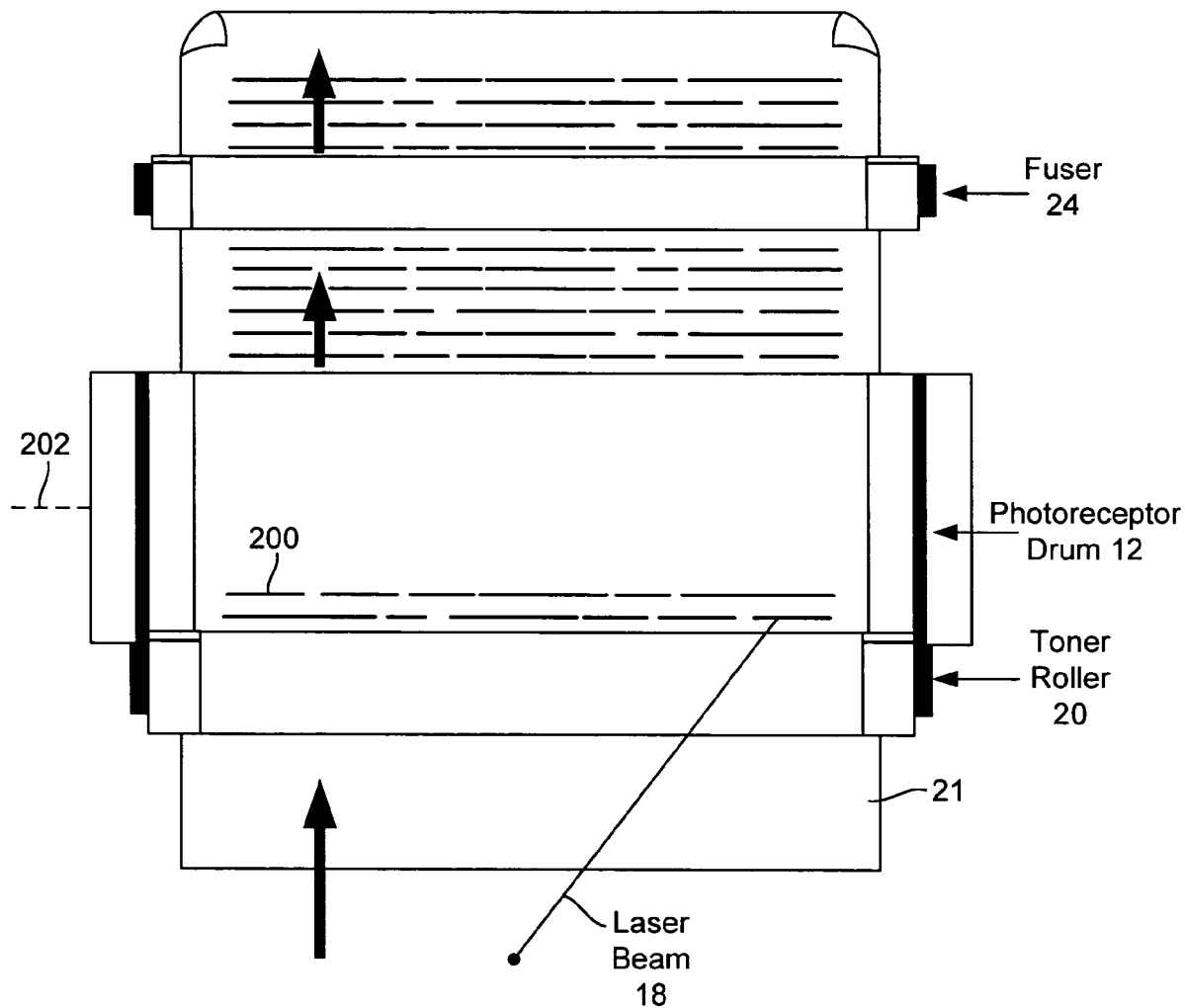
FIG. 2 is a top view of the conventional laser printer of FIG. 1 better illustrating the operation of the photoreceptor drum, laser beam, toner roller, paper, and fuser during operation of the laser printer.
Figure 3:
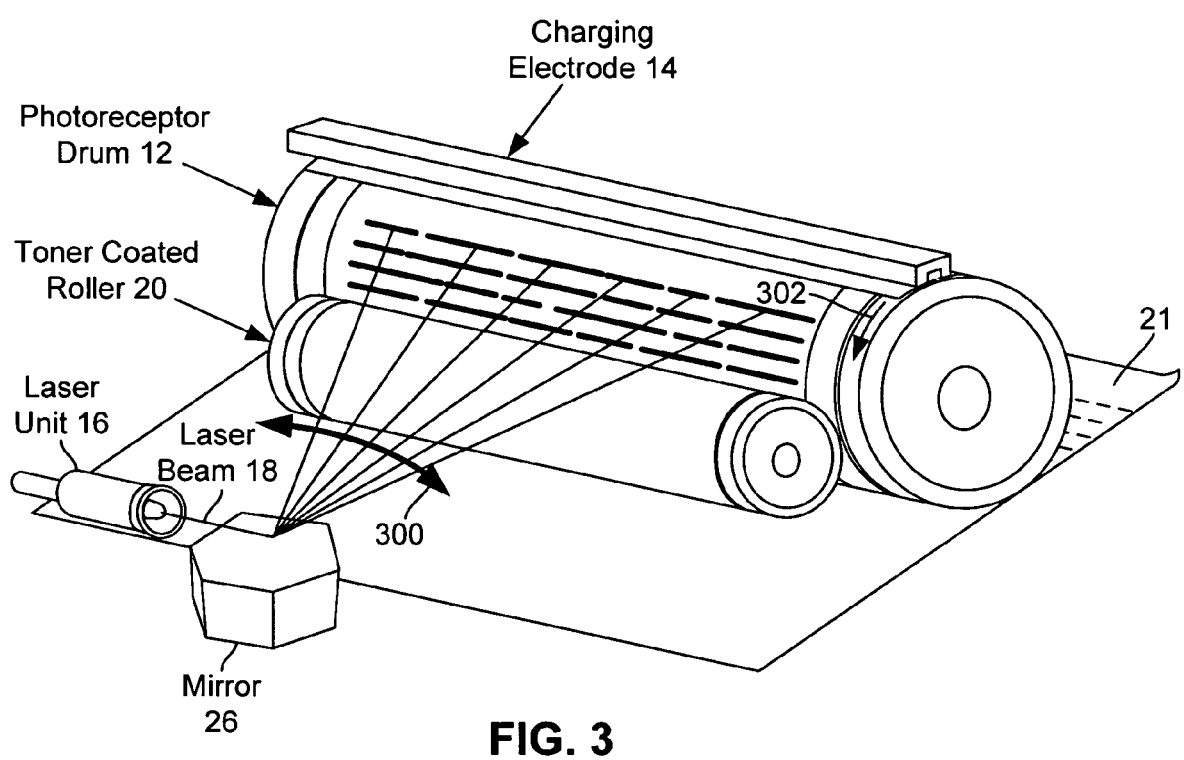
FIG. 3 is a perspective view of various components of the conventional laser printer of FIG. 1 that better illustrates the scanning of the laser beam in a horizontal direction across the drum during operation of the laser printer.
Figure 4:
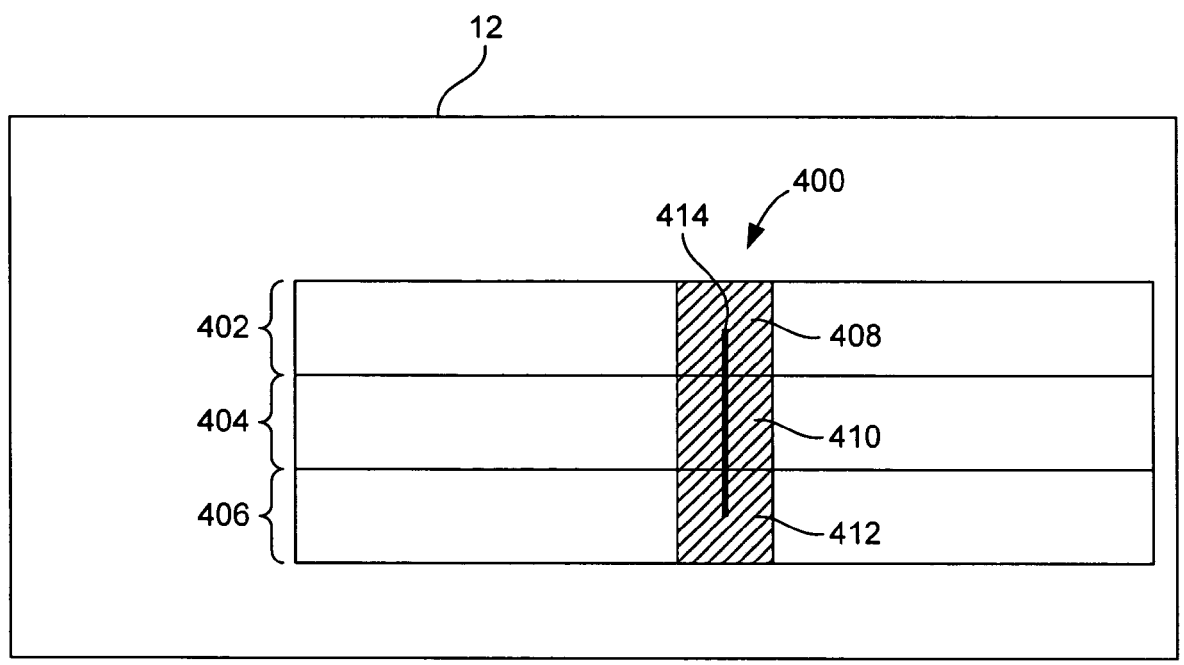
FIG. 4 is a diagram of a scan line pattern produced by the laser printer of FIG. 1 where the rotational speed of the photoconductive drum is constant.
Figure 5:
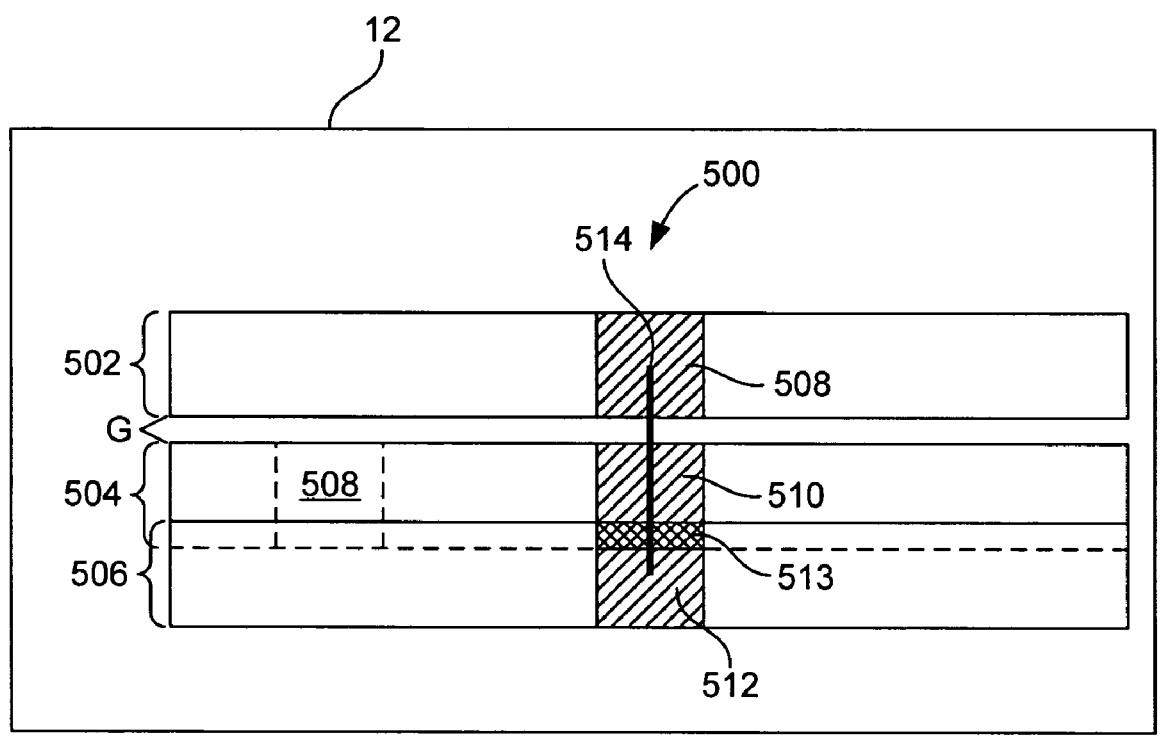
FIG. 5 is a diagram of scan line pattern produced by the laser printer of FIG. 1 that includes banding cause by variations in the rotational speed of the photoconductive drum.
Figure 6:
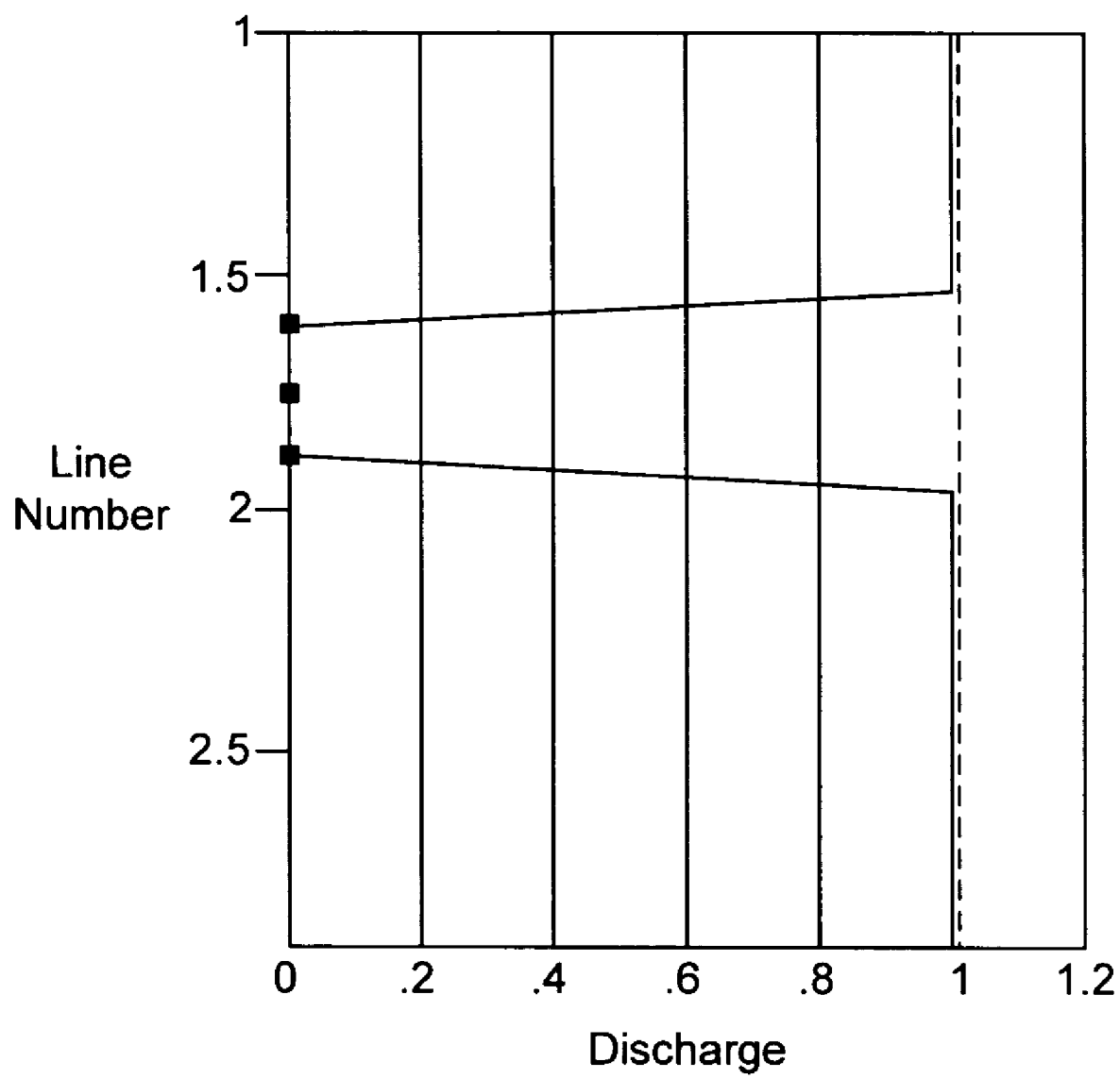
FIG. 6 is a graph showing the variation in the discharge of dots in each of the scan lines for the scan line patterns of FIGS. 4 and 5.
Figure 7:
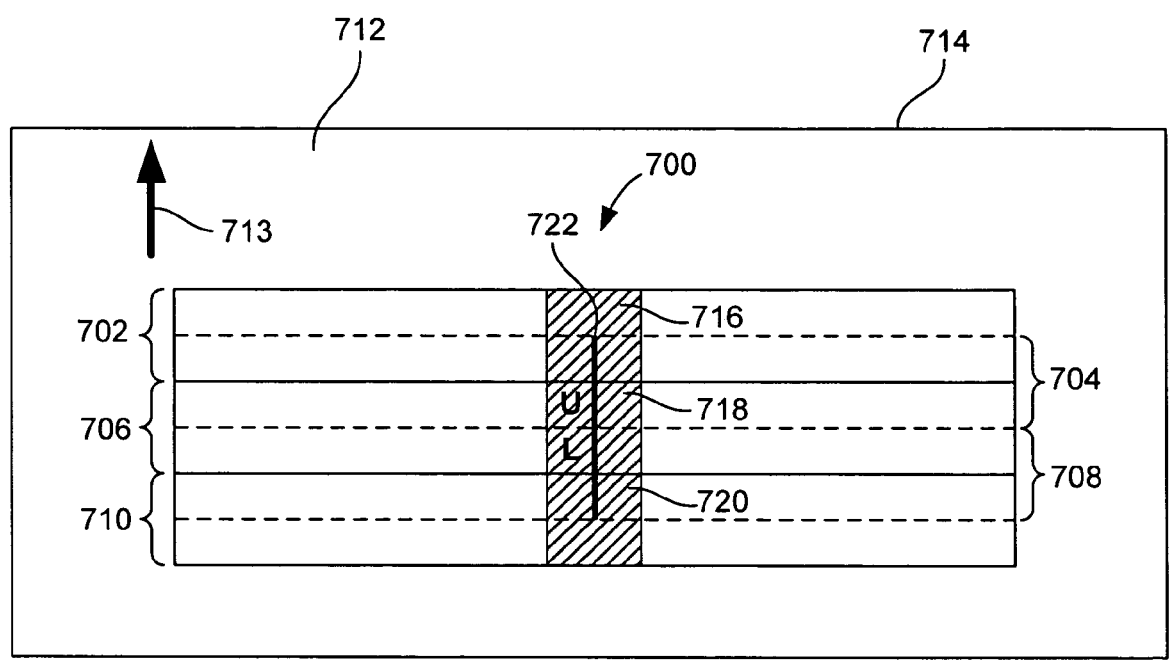
FIG. 7 is a diagram of an ideal overlapping scan line pattern produced by a laser printer the according to a first embodiment of the present invention.

FIG. 7 is a diagram of an ideal overlapping scan line pattern 700 produced by a laser printer according to a first embodiment of the present invention. The scan line pattern 700 includes a number of scan lines 702-710, with the scan line 704 overlapping the scan lines 702 and 706 and the scan line 708 overlapping the scan lines 706 and 710. The scan lines 702-710 represent the scan lines that a laser beam traverses on a photoconductive surface 712 of a rotating drum 714. In the example of FIG. 7, the surface 712 moves in the direction indicated by an arrow 713 and the laser beam scans from left to right in generating each scan line 702-710, such as would be the case when the beam is reflected by a rotating mirror as previously described with reference to FIGS. 1-3. In the scan line pattern 700, the overlapping scan lines 704 and 708 are in contrast to the conventional nonoverlapping scan line pattern 400 as previously discussed with reference to FIGS. 4 and 5. The overlap of the scan lines 702-710 makes the resulting discharged areas or dots on the surface 712 less susceptible to variations in the speed of the drum 714 and thereby reduces banding, as will be explained in more detail below.

The formation of discharged dots with the scan line pattern 700 will now be explained in more detail by way of example. In FIG. 7, a vertical column of dots includes dots 716-720, each dot having an upper half designed "U" and a lower half designated "L" as shown for the dot 718 in the scan line 706. The dot 718 is formed by scanning each of the halves U and L twice in the embodiment of FIG. 7. In forming the dot 718, the laser beam first scans the overlapping scan line 704 which scans the upper half U of the dot 718 a first time to remove a first portion of the charge from this region. The laser beam thereafter scans the scan line 706, which scans the upper half U of dot 718 a second time to remove a second portion of charge from this region and discharge the region to its desired state. The scanning of line 706 also scans the lower half L of dot 718 a first time to remove a first portion of the charge from this region. Finally, the laser beam scans the overlapping scan line 708 to thereby scan the lower half L of dot 718 a second time and remove a second portion of charge from this region and discharge the region to its desired state. In this way, three scans of the laser beam are required to form a dot 718 in the pattern 700, with two passes of the laser beam forming each of the upper and lower halves U and L.

With the overlapping scan line pattern 700, the modulation of the laser beam as it traverses each scan line 702-710 must of course be modified to remove the proper amount of charge. In the embodiment of FIG. 7, the intensity of the laser would be half of what it would be in the conventional nonoverlapping scan pattern of FIG. 4. This way for each half U and L of the dot 718 and the other dots 716 and 720 in the vertical column of dots being formed, half of the desired charge is removed in the first scan and the other half in the second scan. Also note that in the ideal scan line pattern shown in FIG. 7, during the formation of the dot 718 half the full charge is also removed in the half scan lines just above and below the dot. In other words, during the scan line 704 the laser removes not only half the charge in the upper half U of the dot 718 but also removes half the charge in the lower half of the dot 716. The same is true of the upper half of the dot 720 just below the dot 718, which has half the charge removed during scanning of the scan line 708. In the cases where a vertical column of consecutive dots 716-720 is being formed, which is the case where banding could occur, these extra areas actually help reduce banding by removing this additional charge. A vertical line 722 shown in FIG. 7 extending vertically from the vertical midpoint of scan line 702 and extending to the vertical midpoint of scan line 710 will be discussed in more detail below with reference to FIG. 9.

Note the scan line pattern 700 of FIG. 7 once again assumes a perfect linear discharge of regions on the surface 712 of the drum 714 and a perfectly uniform intensify profile for the laser beam. Actual discharge patterns would be different due to nonlinear discharge of regions on the surface 712 of drum 714 and due to a nonuniform (typically Gaussian) intensity profile for the laser beam, as was mentioned above with regard to conventional laser printers. Details of the physics and the nuances of operation of actual laser printers will be understood by those skilled in the art. Therefore, the present description will only discuss and illustrate ideal operation where discharge is perfectly linear and the intensity profile of the laser beam is perfectly uniform in order to more clearly illustrate the inventive aspects of the present invention.

Where a given dot is the last dot in a vertical column of dots, the laser beam is modulated differently to create a desired discharge end point, as will be understood by those skilled in the art. For example, assume dot 716 is a white dot, meaning the dot 718 is the last dot in a vertical column of dots. A different laser modulation, the nonlinear discharge of the surface 712, and nonuniform intensity profile of the laser beam means that half the desired amount of discharge would not actually be removed as described above for the lower half of dot 716 during the scan line 704. This is true because the shorter amount of laser on-time, the nature of the Gaussian intensity profile of the laser beam and the nonlinear discharge of the surface 712 combine to remove most the charge from the top of scan line 706 (i.e., from the upper half U of dot 718) instead of from the lower half of dot 716. This would result in toner being attracted to the upper half U of dot 718 in scan line 706 and very little toner being attracted to the lower half of dot 716 above the dot 718 as a consequence of scan line 704.

The substantially overlapping scan lines 702-710 cause the discharged dots 716-720 generated on the photoconductive surface 712 to be less sensitive to small variations in speed of the photoconductive drum 714, which results in less banding. The reason for this will now be described in more detail with reference to FIG. 8, which is a diagram showing the effect of an overlapping scan line pattern 800 including a number scan lines 802-810. The figure depicts an example where the rotational speed of a photoconductive surface 812 on a drum 814 varies, which may be caused by imperfections in gears driving the drum, variations in the rotational speed of motor driving the gears, or other factors. The surface 812 travels in the direction indicated by an arrow 813 and a laser beam scans from left to right in generating each scan line 802-810, which would be the case when the laser beam is reflected off a rotating mirror as previously discussed.

Figure 8:
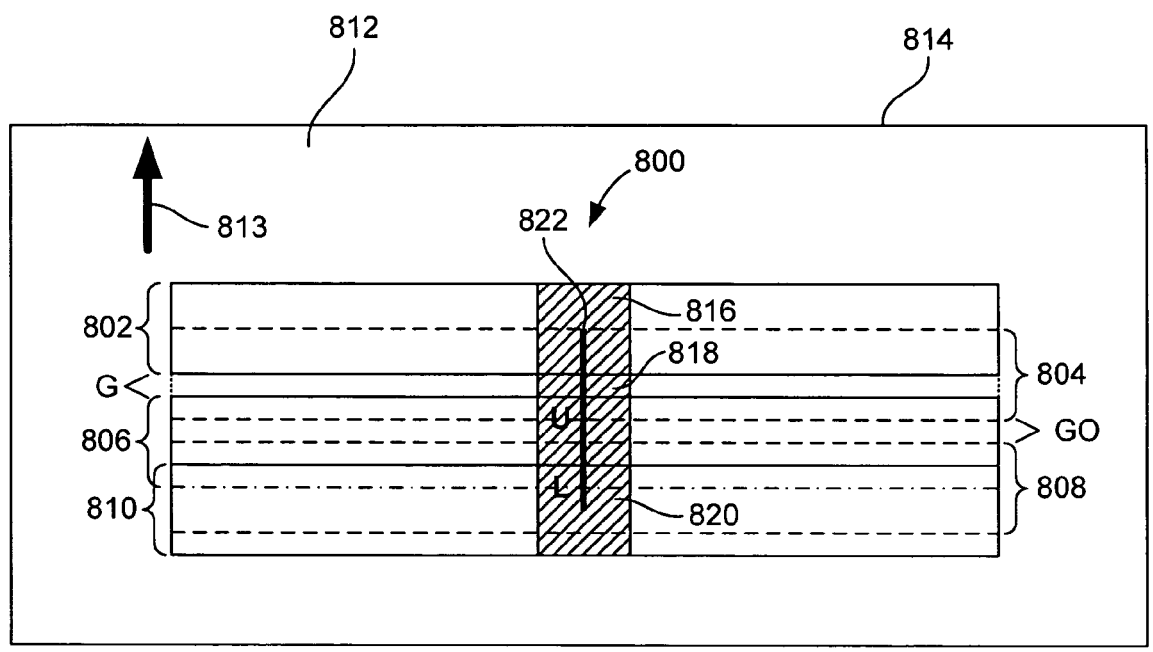
FIG. 8 is a diagram showing the effect of an overlapping scan line pattern according to an embodiment of the present invention when the rotational speed of the photoconductive drum varies.

The scan lines 802-810 are the scan lines on the surface 812 that result from a temporary increase in the rotational speed of the drum 814. In the example of FIG. 8, after the laser beam traverses the scan lines 802 and 804 the drum 814 speeds up. This increase in speed of the drum 814 results in a gap G between the scan lines 802 and 806 in the same way as previously described with reference to FIG. 5. With the overlapping scan line pattern 800, the laser beam traverses the gap G during the scan line 804. As a result, a first portion of charge is removed from the gap G where a dot 818 is ideally to be formed. The dot 818 is intended to be a dot formed in the scan line 806 just as was the dot 718 in FIG. 7, but due to the gap G the formation of the dot 818 is very different. The gap G has a height that is less than half the height of the scan lines 802-810 merely by way of example in FIG. 8.

In the formation of the dot 818, the laser beam scans an upper half U of the dot as the beam traverses the overlapping scan line 804. Thus, since each pass of the laser beam is assumed to remove half the desired amount of charge in the embodiment of FIG. 8, half the desired amount of charge is removed from the upper half U during the scan line 804.

Next, the laser beam traverses the scan line 806 after the drum 814 has speeded up. As a result, there is the gap G between the bottom of the scan line 802 and the scan line 806. The height of the gap G in FIG. 8 is assumed to be equal to the height G of the gap G in FIG. 5. This gap G in FIG. 8 means that the scan line 806 is offset by the height of this gap from the ideal location of the scan line 806. Therefore, as the laser beam traverses scan line 806 only a portion of the upper half U of the dot 818 is scanned along with all of a lower half L of the dot 818. At this point, although the full charge should be removed from the upper half U of the dot 818 due to the scan lines 804 and 806, the full charge is removed only from the portion of the upper half U that the beam traversed during the scan line 806. The remainder of the upper half U has half the full charge removed. While only half the full charge has been removed from the upper half U in the gap G when ideally the full charge should have been removed, removal of half the charge is better than no removal of charge at all as was the case with the conventional scan line pattern 500 of FIG. 5.

The laser beam next traverses the overlapping scan line 808. The example of FIG. 8 includes an additional gap GO between the scan lines 804 and 808, which may or may not occur depending on mechanical and electrical components (not shown) in the laser printer (not shown) generating the scan pattern 800. With the gap GO, as the laser beam traverses the scan line 808 just after traversing scan line 806 only a portion of the lower half L of dot 818 is scanned. As a result, the full charge in the lower half L is removed only in the portion scanned by scan lines 806 and 808. The remainder of the lower half L, which is equal to the height of the lower half minus the height of the additional gap GO, was scanned only once during the scan line 806 and therefore has half the full charge removed. Once again, while ideally the entire lower half L of the dot 816 has been fully discharged at this point, at least a portion of the lower half has been fully discharged notwithstanding the gaps GO and G caused by variations in the speed of the drum 814. A vertical line 822 shown in FIG. 8 extending vertically from the vertical midpoint of scan line 802 and extending to the vertical midpoint of scan line 810 will be discussed in more detail below with reference to FIG. 9.

As discussed with reference to FIG. 7, under the ideal conditions being assumed in the example of FIG. 8, namely perfect discharge of regions on the surface 812 and a perfectly uniform intensity profile for the laser beam, areas above and below the dot 818 have half the full charge removed due to the scan lines 804 and 808, respectively. In the cases where the vertical column of consecutive dots 816-818 is being formed, which is the case where banding could occur, these extra areas actually help reduce banding by removing this additional charge. For example, in the example of FIG. 8 the scan line 808 removes half the full charge in the area from the bottom-of dot 818 to the bottom of this scan line. When the laser beam traverses scan line 810, the full charge will be removed from these areas as desired. Note that in FIG. 8 the lower edge of scan line 806 is shown as a dotted and dashed line. This is done because the scan line 810 overlaps a lower portion of the scan line 806 due to the drum 814 slowing back down to its desired rotational velocity. Thus, the top of the scan line 810 is above the bottom of scan line 806 and the bottom of scan line 806 is represented as a dashed and dotted line. Once again, recall that the average rotational speed of the drum 814 is correct due to the operation of control circuitry (not shown) that controls a motor (also not shown) that drives the rotation of the drum. As a result, an increase in rotational speed of the drum 814 will necessarily be followed by a period during which the drum slows down, offseting the increase in velocity so the average velocity is realized. As a result of this slowing down of the drum 814, the scan lines 806 and 810 overlap.

The overlapping scan line pattern 800 reduces banding caused by variations in the rotational speed of the drum 814. This is true because multiple passes of the laser beam are required to form each desired dot 816 on the surface 812. As a result, if some of these multiple passes do not occur due to speed variations in the drum 814, then the other ones of the passes will still discharge a desired dots 816-820 albeit not by as much as desired.

Figure 9:
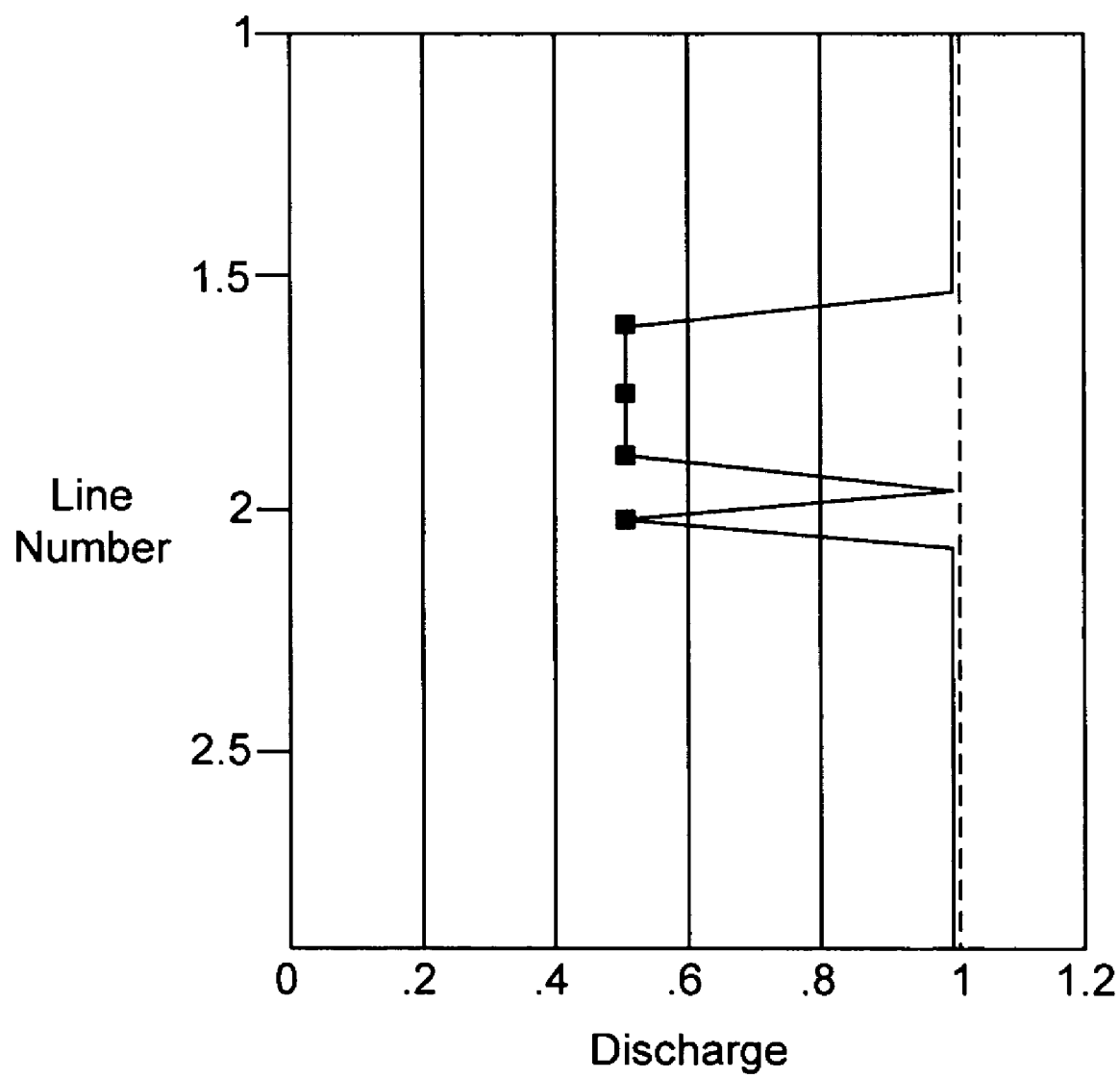
FIG. 9 is a graph showing the variation in the discharge of dots in the scan line patterns of FIGS. 7 and 8.

FIG. 9 is a graph showing the variation in the discharge of dots in the vertical colum of dots in the scan line patterns of FIGS. 7 and 8. The graph shows the variations in the discharge of the dots 716-720 and 816-820 in each of the scan lines for the scan line patterns 700 and 800 of FIGS. 7 and 8, respectively. The vertical lines 722 and 822 shown in FIGS. 7 and 8 represent the vertical axis in FIG. 9 and represent the scan line number or physical location in the scan lines in the vertical direction. The scan line number 1 on the vertical axis in FIG. 9 corresponds to the midpoint of the scan lines 702 and 802. The dotted line in the graph of FIG. 9 corresponds to the ideal pattern 700 where the consecutive vertically aligned dots 716-720 are being formed in scan lines 702-710. The horizontal axis in the graph represents the discharge of the dot, with 1 being fully discharged and 0 being not discharged at all so no dot will be formed.

Ideally each of the dots being formed in the scan lines 702-710 or 802-810 is completely discharged to 1 as shown by the dotted line in the graph. The dotted line thus represents the ideal overlapping scan pattern 700. In contrast, where banding occurs there are gaps in this discharge distribution corresponding to the gaps on the drum 814. The solid lines thus represent the charge distribution for the scan line pattern 800. Due to the overlapping scan lines 802-810, regions that ideally should have been completely discharged to 1 are at least partially discharged to ½. This is true because the overlapping scan lines 802-810 each scan the same regions on the drum 814, with the scans collectively forming the desired dots. The first leftward dip the graph results from the gap G while the second dip results from the gap GO. Note that even though these are dips, meaning the regions have not been fully discharged to 1 as desired, the dips are only to ½ since both these gaps gets scanned during one of the scan lines 802-810. As a result, at least some toner will be attracted to the gaps which will provide continous vertical distribution of toner and reduce the visual appearance of banding in the vertical column of dots 816-820.

Figure 10:
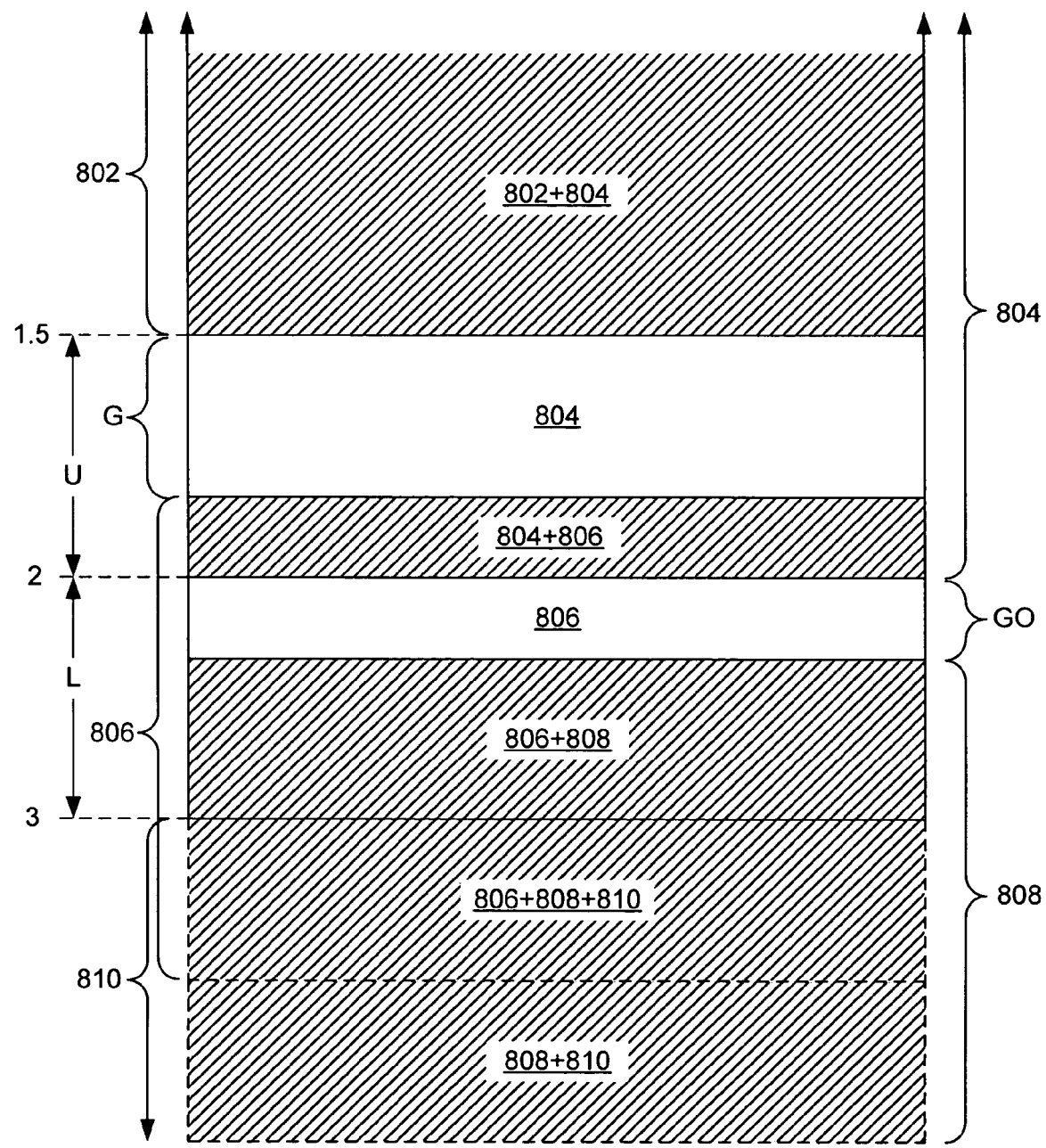
FIG. 10 is representation of the surface of the photoconductive drum of FIG. 8 showing the various discharged and charged areas resulting from the scanning line pattern of FIG. 8.

FIG. 10 is representation of the surface of the photoconductive drum 814 of FIG. 8 showing the various discharged and charged areas in the vertical column of dots 816-820 resulting from the scanning line pattern 800. This figure merely shows what is depicted in the graph of FIG. 9 in an alternative way. The cross-hatched regions represent areas in a vertical column of dots that have been fully discharged to 1 while the white areas represent areas that have been scanned only once and thus discharged to ½. The scan line number is shown on the left in the figure. Starting from the top, the scan lines 802 and 804 result in the topmost fully discharged region. Next comes the gap G, which is only scanned during the scan line 804 and is thus discharged to ½. Next comes a small fully discharged region scanned during scan lines 804 and 806, and underneath this region is another region discharged to ½ in the gap GO during the scan line 806. Next come two fully discharged regions formed during scan lines 806 and 808. The lower one of these regions is also scanned during scan line 810 and thus this region is indicated as being discharged during scans "806+808+810." Below this region is another fully discharged region formed during the scanning of lines 808 and 810. The slowing down of the drum 814 is reflected by the overlap of scan lines 806 and 810 as previously discussed. In the example of FIG. 10 it is assumed the vertical column of dots 816-820 extends above the dot 816 and below the dot 820. Where a given dot is the last dot in a vertical column of dots, the laser beam is modulated differently to create a desired discharge end point, as will be understood by those skilled in the art.

Once again, it should be noted that all of FIGS. 7-10 assume a perfect linear discharge of regions on the surfaces of the rotating drums and also assume a perfectly uniform intensity profile for the laser beam. Actual discharge patterns would be different due to nonlinear discharge of regions on the surfaces of drums and due to nonuniform, typically Gaussian, intensity profiles for the laser beams. As a result of this nonlinear discharge of the surface 712 and nonuniform intensity profile of the laser beam, some of the discussion of removal of charge may not actually occur as dicussed in these ideal examples. Recall, for example, that if the dot 816 is a white dot, meaning the dot 818 is the last dot in a vertical column of dots, then half the desired amount of discharge would not actually be removed from the scan line 702 in FIG. 7. Similarly, in the ideal example of FIG. 10 certain scan lines may not actually discharge regions exactly as described due to the nonlinearities of the discharge on the surface of the drum and the nonuniform intensity profile of the laser beam. These ideal examples are utilized merely to more clearly illustrate inventive aspects of the present invention and to avoid obscurring these inventive aspects with a relativley complex and detailed discussion of the physics and actual operation resulting from these nonlinearities and nonuniformities, which will be understood by those skilled in the art.

In all the above figures, the photoconductive surface of the drum is moving in what is termed a vertical direction while the scan line pattern is being produced as the laser beam is scanned in a horizontal direction. As a result, the scan lines in each pattern are not actually produced in a perfectly horizontal direction across the photoconductive surface of the drum. Instead, each scan line is angled slightly since the drum is rotating as the laser beam scans across the surface. With the photoconductive surface moving upward in the above example scan line patterns 700 and 800 of FIGS. 7 and 8, each scan line would actually be angled downward slightly from left to right across the surface. Although angled downward, the scan lines are all scanned in the same horizontal direction from left to right across the surface and are therefore parallel to each other so that the amount of overlap for adjacent lines stays substantially constant as each line is scanned. As will be understood by those skilled in the art, the rotational axis of the rotational mirror 26 of FIG. 1 could be adjusted to compensate for this angling of the scan lines.

Note that in a laser printer that generates a scan line pattern such as the patterns 700 and 800, the speed at which the laser beam is scanned across the photoconductive drum must be adjusted. In one embodiment, the rotational speed of the drum is slowed down and the horizontal scanning rate of the laser beam is left the same as in a conventional laser printer. In this embodiment, the power of the laser beam is reduced to remove the desired amount of charge on each scan. For example, where two scans of the laser beam are required to fully discharge a region then the power of the laser beam would be adjusted accordingly to remove the required amount of charge on each scan. In another embodiment, the rotational speed of the drum is left the same as in a conventional laser printer and the scanning rate of the laser beam is increased. The increase in the scanning rate depends upon the overlap of the scan lines, or put another way the scanning rate depends on the number of scans required by the laser beam to fully discharge a region. The greater the number of scans, the faster the required scanning rate.

In the previously described embodiment, a single scan line (or a single pass of the laser beam) does not completely discharge the desired areas on the photoconductor surface. An overlapping scan line is required to completely discharge the areas on the surface of the photoconductor. In such an embodiment, each scan line would overlap the previous scan line by at least 50 percent of the height of the scan line, thus ensuring that each area on the photoconductor surface is ideally scanned twice by the laser. The example embodiment of FIGS. 7 and 8 includes two scans to fully discharge a region, but other embodiments include more scans. In the situation where the amount of overlap of the scan lines is substantially constant as the laser beam scans across the photoconductive surface, the modulation of the laser beam is relatively simple as described above and the modulation need not be adjusted according to the amount of overlap of the adjacent scan lines.

A pulse modulation technique similar to resolution doubling may also be used according to another embodiment of the present invention. In resolution doubling, the laser beam is modulated to place partial charges next to each other on different scans of the laser beam in such a way that a new charge can be formed that acts as if there was a scan of the laser beam at a different location. For example, the laser beam is modulated in such a way that charge will be attracted between two scan lines and in this way doubles the resolution of the printer. This technique may be combined with the significantly overlapping scans to allow individual charges to be placed very accurately on the photoconductive surface of a rotating drum.

Figure 1:
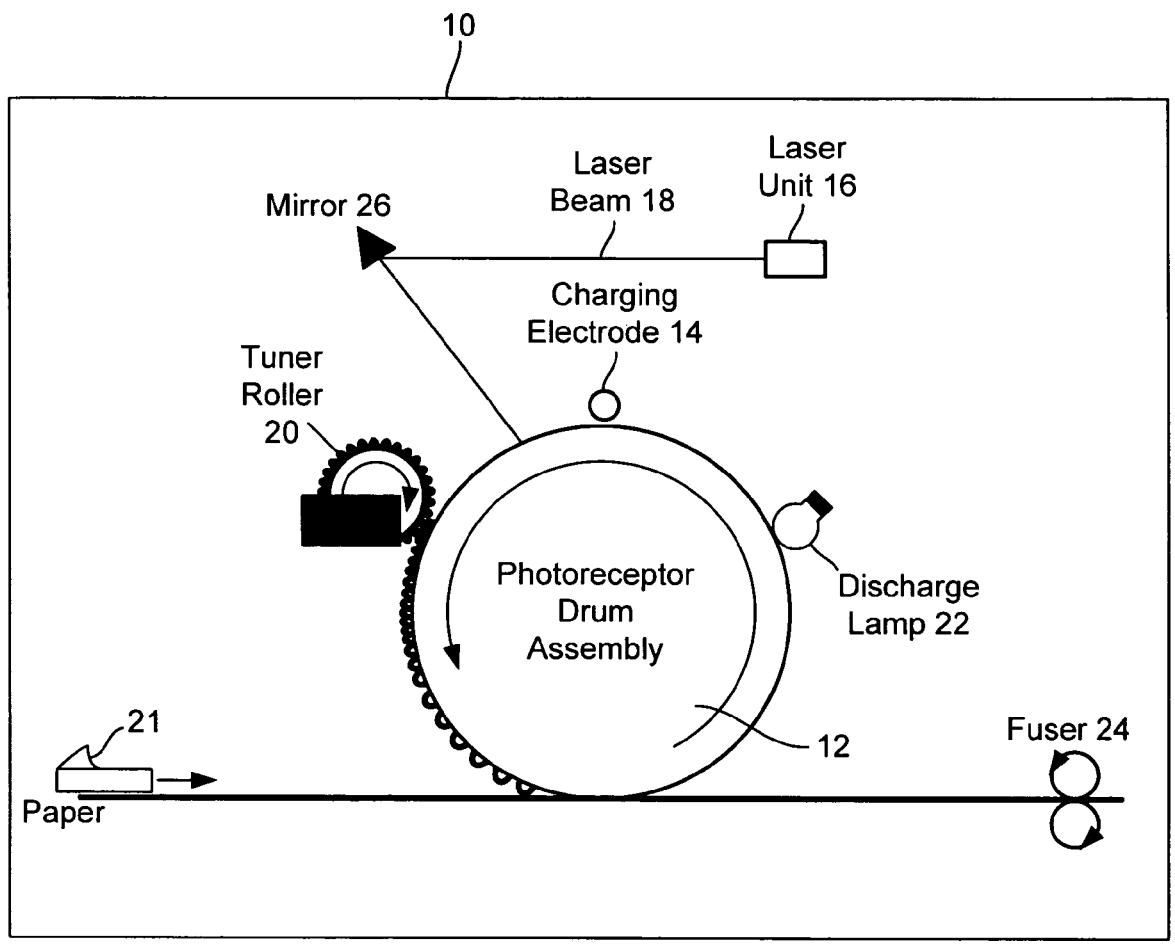
FIG. 1 is a cross-sectional view showing the primary components of a conventional laser printer.

Other embodiments of the present invention may be utilized in laser printers that include an oscillating mirror in place of the rotating mirror 26 of FIG. 1. In one such embodiment, the oscillating mirror scans the photoconductive drum in both horizontal directions or "bidirectionally," meaning from left to right and right to left across the drum. Because the speed of the laser beam varies in the horizontal direction with an oscillating mirror, the amount of overlap of consecutive scan lines will also vary as a function of the horizontal position of the laser beam. Also, because the laser beam is scanned in both directions across the drum, consecutive scan lines are not parallel to each other. As a result of consecutive scan lines not being parallel, the amount of overlap of consecutive scan lines changes as the scan line progresses in a given direction. The modulation of the laser beam is modified in these embodiments to remove the desired amount of charge as a function of the horizontal position and scanning direction of the laser beam.

The amount of overlap of adjacent scan lines varies in different embodiments of the present invention, with the number of multiple passes of the laser beam required to form each dot depending upon the amount of overlap. For different amounts of overlap, the number of segments each dot is divided into and the number of scan lines required to form each dot varies. Assume X is an integer corresponding to the number of equal horizontal segments that each dot is divided into and is defined by the amount of overlap of consecutive scan lines. For an overlap of ½ between consecutive scan lines, there are two segments (X=2) per dot and two scans to fully discharge each segment. In this situation, which corresponds to the above described examples, three scan lines are required to fully form an individual dot. In another example, assume there is an overlap of ⅔ between consecutive scan lines such that there are 3 segments (X=3) per dot, each segment being ⅓ of a dot or pixel. Three scan lines are required to discharge each segment in this example and five scan lines required to fully form an individual dot. In general, where each individual dot is divided into X equal horizontal segments, the overlap of consecutive scan lines equals (X−1)/X and each segment requires X scans to fully discharge that segment. The total number of scan lines required to fully form each dot is equal to (2X−1). Note that X is assumed to be an integer in the above examples, with the more general situation of an arbitrary overlap being a much more difficult situation to generalize. Also note that for an overlap of 0 to just less than ½, some portion or segment of each dot cannot be scanned more than one time. For overlap values between ½ and ⅔, some segments would be scanned two times while other segments would be scanned three times. While this could be done, ideally all of the segments within a given scan line are scanned the same number of times.

The multiple scans required to form each dot according to embodiments of the present invention make the dots less susceptible to banding since multiple passes are required to fully discharge a given dot. As a result, if variation in the speed of the rotating drum occurs, segments of a given dot will be at least partially discharged and any banding effects reduced or eliminated, at least as far as a corresponding printed image appears to a person.

From the foregoing it will be appreciated that, although specific embodiments of the invention have been described herein for purposes of illustration, various modifications may be made without deviating from the spirit and scope of the invention. For example, although the beam being utilized to discharge the photoconductive drum has been described as a laser beam, other light generating sources may be used as well if suitable in particular applications. Thus, the term laser beam is not limited to a beam of light generated by a laser but instead should be construed broadly as an image beam that is a suitable electromagnetic beam generated by an suitable means in a given printer application.

The invention claimed is:

1. A printer comprising:
   a photoconductive drum;
   a laser unit operable to generate a laser beam;
   a reflective element positioned to reflect the laser beam onto the photoconductive drum;
   a controller in communication with the laser unit and the reflective element, the controller configured to scan the laser beam along a plurality of scan lines to form dots on the photoconductive drum, wherein each scan line partially overlaps an adjacent scan line and each dot comprises a plurality of segments, and wherein the controller is configured to generate each of the plurality of segments by directing the laser beam to remove a portion of a desired amount of charge on each scan line; and
   wherein the controller is configured to operate such that, if the photoconductive drum moves at an expected rate, overlapping scan lines remove the desired amount of charge from each segment and if the photoconductive drum moves at an unexpectedly fast rate such that an amount of overlap of the adjacent scan lines is reduced, a portion of the desired amount of charge is removed from segments formed by non-overlapped scan lines.

2. The printer of claim 1, wherein the controller is further configured to modulate the laser beam to affect a charge between overlapping scan lines such that a resolution doubling is achieved.

3. The printer of claim 1, wherein the controller is configured to scan the laser beam along scan lines that overlap by at least 50% such that the desired amount of charge is removed for a respective one of the plurality of segments using at least two overlapping scan lines.

4. The printer of claim 1, wherein each dot is divided into X equal horizontal segments, and wherein an amount of overlap of consecutive scan lines equals (X−1)/X and X scans of the laser beam are used to discharge the desired amount of charge for each segment, with a total number of scan lines used to fully form each dot being approximately equal to (2X−1).

5. The printer of claim 4, wherein X equals 2.

6. The printer of claim 1, wherein the reflective element is operable to rotate about an axis of rotation to scan the laser beam through the plurality of scan lines.

7. The printer of claim 1, wherein the laser unit comprises a laser diode.

8. The printer of claim 1, wherein the reflective element comprises a movable mirror.

9. The printer of claim 8, wherein the movable mirror comprises an oscillating mirror configured for scanning the laser beam bidirectionally across the photoconductive drum.

10. The printer of claim 1, wherein an overlap of adjacent scan lines is substantially constant.

11. The printer of claim 1, wherein an overlap of adjacent scan lines is variable.

12. The printer of claim 1, wherein the controller is configured to modulate an intensity of the laser beam as a function of an amount of overlap of adjacent scan lines.

13. A printer comprising:
    means for forming discharge regions in response to receiving an image beam;
    means for generating the image beam;
    means for reflecting the image beam onto the means for forming discharge regions;
    means for scanning the image beam along a plurality of scan lines to form dots on the means for forming discharge regions, wherein each scan line partially overlaps an adjacent scan line and each dot comprises a plurality of segments, and wherein the means for scanning is further configured to generate each of the plurality of segments by directing the image beam to remove a portion of a desired amount of charge on each scan line; and
    wherein the means for scanning is configured to operate such that, if the means for forming discharge regions moves at an expected rate, overlapping scan lines remove the desired amount of charge from each segment and if the means for forming discharge regions moves at an unexpectedly fast rate such that an amount of overlap of the adjacent scan lines is reduced, a portion of the desired amount of charge is removed from segments formed by non-overlapped scan lines.

14. The printer of claim 13, wherein the means for scanning is further configured to modulate the image beam to affect a charge between overlapping scan lines such that a resolution doubling is achieved.

15. The printer of claim 13, wherein the means for scanning is configured to scan the image beam along scan lines that overlap by at least 50% such that the desired amount of charge is removed for a respective one of the plurality of segments using at least two overlapping scan lines.

16. The printer of claim 13, wherein each dot is divided into X equal horizontal segments, and wherein an amount of overlap of consecutive scan lines equals (X−1)/X and X scans of the image beam are used to discharge the desired amount of charge for each segment, with a total number of scan lines used to fully form each dot being approximately equal to (2X−1).

17. The printer of claim 16, wherein X equals 2.

18. The printer of claim 13, wherein the means for reflecting is operable to rotate about an axis of rotation to scan the image beam through the plurality of scan lines.

19. The printer of claim 13, wherein the means for generating the image beam comprises one of a laser or a laser diode.

20. The printer of claim 13, wherein the means for reflecting comprises a movable mirror.

21. The printer of claim 20, wherein the movable mirror comprises an oscillating mirror configured for scanning the image beam bidirectionally across the means for forming discharge regions.

22. The printer of claim 13, wherein an overlap of adjacent scan lines is substantially constant.

23. The printer of claim 13, wherein an overlap of adjacent scan lines is variable.

24. The printer of claim 13, wherein the means for scanning is configured to modulate an intensity of the image beam as a function of an amount of overlap of adjacent scan lines.

25. A method of scanning an image beam to discharge regions on an image beam sensitive surface, each discharge region comprising at least one dot and each dot comprising a plurality of segments, the method comprising:

scanning the image beam through a plurality of scan lines on the image beam sensitive surface, each scan line being positioned to overlap adjacent scan lines and a plurality of scan lines overlapping each segment; and for each segment, discharging a portion of a desired amount of charge for that segment on a respective scan line overlapping that segment in response to each scan of the image beam through the plurality of scan lines; and wherein if the image beam sensitive surface moves at an expected rate, overlapping scan lines remove the desired amount of charge from each segment and if the image beam sensitive surface moves at an unexpectedly fast rate such that an amount of overlap of the adjacent scan lines is reduced, a portion of the desired amount of charge is removed from segments formed by non-overlapped scan lines.

26. The method of claim 25, further comprising modulating the image beam to affect a charge between overlapping scan lines such that a resolution doubling is achieved.

27. The method of claim 25, wherein scanning the image beam through the plurality of scan lines comprises scanning the image beam so that the scan lines overlap by at least 50% such that the desired amount of charge is removed for a respective one of the plurality of segments using at least two overlapping scan lines.

28. The method of claim 25, wherein each dot is divided into X equal horizontal segments, and wherein scanning the image beam comprises overlapping consecutive scan lines by an amount equal to (X−1)/X, where X scans of the image beam are used to discharge the desired amount of charge for that segment, and a total number of scan lines used to fully form each dot approximately equal to (2X−1).

29. The method of claim 28, wherein X equals 2.

30. The method of claim 25, wherein the image beam comprises a laser beam.

31. The method of claim 30, wherein scanning the image beam comprises reflecting the laser beam of a rotating reflective element.

32. The method of claim 31, wherein the rotating reflective element mirror comprises an oscillating mirror configured for scanning the laser beam bidirectionally.

33. The method of claim 25, wherein scanning an image beam comprises directing the image beam to overlap on adjacent scan lines a substantially constant amount.

34. The method of claim 25, wherein scanning an image beam comprises directing the image beam to overlap on adjacent scan lines a variable amount.

35. The method of claim 25, further comprising modulating an intensity of the image beam as a function of an amount of overlap of adjacent scan lines.

* * * * *